(12) United States Patent
Crabtree et al.

(10) Patent No.: US 8,339,804 B2
(45) Date of Patent: *Dec. 25, 2012

(54) PROGRAMMABLE ROUTING MODULE

(75) Inventors: John D. Crabtree, Akron, OH (US);
Jerry Li Penick, Shaker Heights, OH
(US); Gregg M. Sichner, Mentor, OH
(US); David S. Wehrle, Chesterfield, OH
(US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 190 days.

This patent is subject to a terminal disclaimer.

(21) Appl. No.: 12/844,110

(22) Filed: Jul. 27, 2010

(65) Prior Publication Data

US 2010/0293307 A1  Nov. 18, 2010

Related U.S. Application Data

(63) Continuation of application No. 11/467,586, filed on Aug. 28, 2006, now Pat. No. 7,800,919.

(60) Provisional application No. 60/785,550, filed on Mar. 24, 2006, provisional application No. 60/793,814, filed on Apr. 21, 2006.

(51) Int. Cl.
*H05K 1/11* (2006.01)
(52) U.S. Cl. ........ 361/803; 361/748; 361/785; 361/784; 370/230

(58) Field of Classification Search ................ 710/1, 11, 710/36, 38, 72, 301, 100, 305, 316, 230, 710/355, 356, 351, 911, 315; 361/760, 785, 361/784, 748, 759, 761, 764, 789, 803, 778, 361/779, 808, 767; 370/230, 355, 356, 351, 370/911, 908, 469, 236, 244, 219, 249; 700/150; 709/230; 714/6, 25, 47; 382/121, 236, 8; 439/76.1, 189, 620.01; 174/260–266

See application file for complete search history.

(56) References Cited

U.S. PATENT DOCUMENTS

| | | | |
|---|---|---|---|
| 5,526,278 | A | 6/1996 | Powell |
| 6,154,683 | A | 11/2000 | Kessler et al. |
| 6,767,223 | B2 | 7/2004 | Lostoski et al. |
| 6,881,101 | B2 | 4/2005 | Sichner et al. |
| 6,916,194 | B2 | 7/2005 | Sichner et al. |
| 7,021,974 | B2 | 4/2006 | Sichner et al. |
| 7,080,150 | B1 | 7/2006 | Wehrle et al. |
| 2006/0064512 | A1* | 3/2006 | Shepard et al. ............ 710/8 |
| 2006/0155900 | A1* | 7/2006 | Sagues et al. ............ 710/72 |

* cited by examiner

*Primary Examiner* — Hoa C Nguyen
(74) *Attorney, Agent, or Firm* — Fay Sharpe LLP; Scott Speroff; John M. Miller (57) ABSTRACT

A programmable routing module is disclosed for interconnecting field wiring with a control system. The routing module includes a field connection to connect field signals from a controlled process to the routing module, an I/O connection to connect I/O signals from the control system to the routing module, and a configurable interconnection system that selectively couples particular field and I/O signals with one another.

20 Claims, 10 Drawing Sheets

PROGRAMMABLE ROUTING MODULE

REFERENCE TO RELATED APPLICATIONS

This application is a continuation of and claims priority to and the benefit of U.S. patent application Ser. No. 11/467,586, filed Aug. 28, 2006 now U.S. Pat. No. 7,800,919 and entitled PROGRAMMABLE ROUTING MODULE, which claims priority to and the benefit of U.S. Provisional Patent Application Ser. No. 60/785,550, filed Mar. 24, 2006, entitled PROGRAMMABLE I/O INTERCONNECTING ADAPTER, and Provisional Patent Application Ser. No. 60/793,814, filed Apr. 21, 2006, entitled PROGRAMMABLE ROUTING MODULE, the entireties of which applications are hereby incorporated by reference.

FIELD OF THE INVENTION

The present invention relates generally to control systems and more particularly to programmable routing modules for interconnecting control system I/O with machines or other controlled processes.

BACKGROUND OF THE INVENTION

Control systems or industrial controllers are used for controlling industrial processes such as machines, manufacturing equipment, and other factory automation apparatus. An industrial controller receives various process variables or other inputs representative of the status of a controlled process, and generates outputs according to a control program or routine to control the process to one or more desired setpoints, where the inputs and outputs can be binary, (e.g., on or off), and/or analog assuming a continuous range of values. The control system, moreover, can be distributed with two or more modules performing various functions, such as I/O modules interfacing with field devices for sending and receiving outputs and inputs, control modules that run the control program and communicate with I/O modules, etc. In such a distributed control system (DCS), input signals received from the controlled process and the outputs transmitted to the process can pass through one or more input/output (I/O) modules, which serve as an electrical interface between the controller and the controlled process, and can be located proximate or remote from the controller. The modules of a DCS can be spatially distributed along a common communication link in several racks, whereby certain I/O modules can be located close to the controlled process proximate a portion of the control equipment, and remote from the remainder of the control system. Data is typically communicated between modules over a common communication link, or network using a communications protocol.

Figure 1:
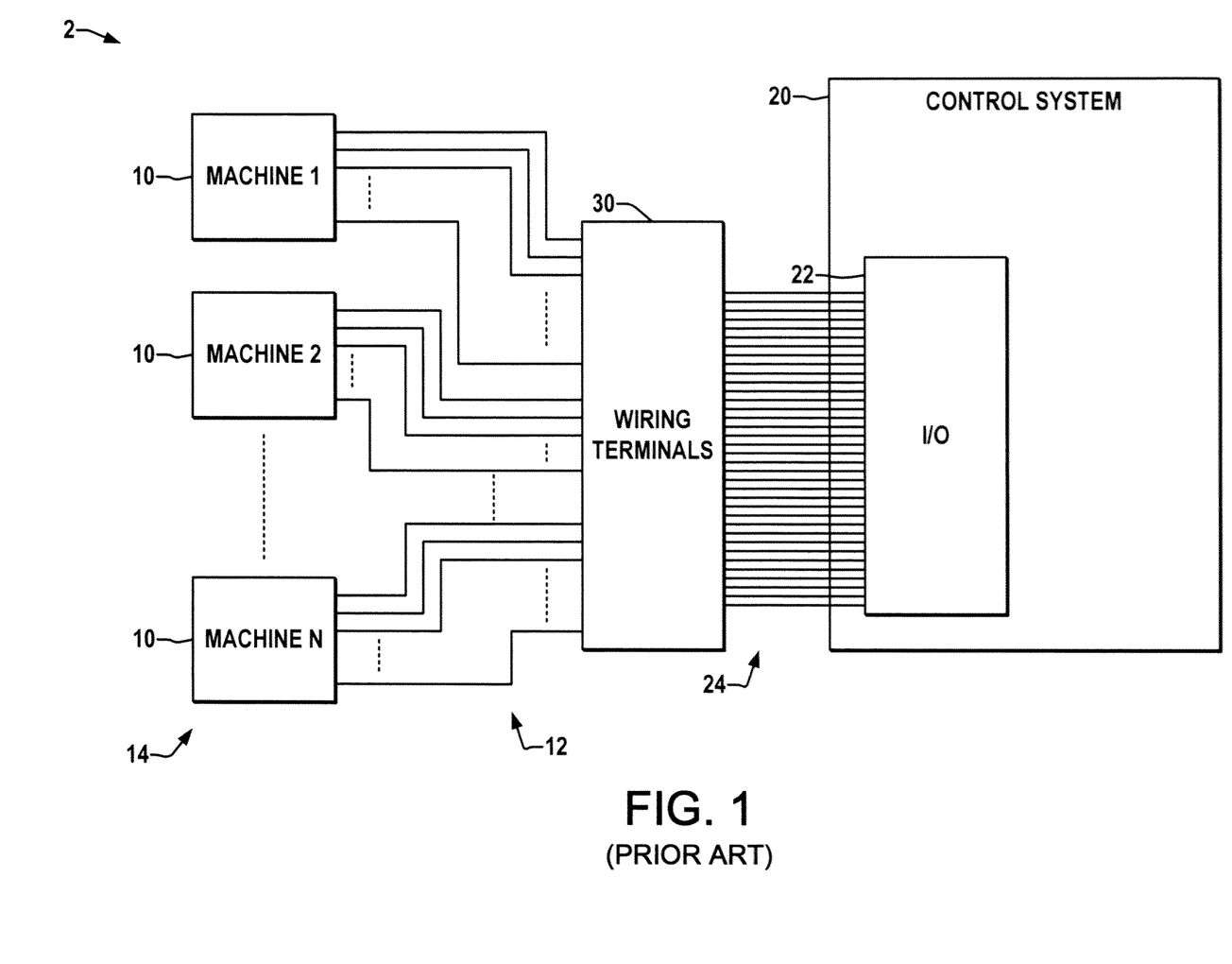
FIG. 1 is a simplified system diagram illustrating a conventional controlled process connected with a control system using wiring terminals.

One problem in conventional control systems is physical interconnection of the field signals of the controlled process with the I/O modules of the control system. For many industrial control applications, such as control of machines or processes involving large numbers of input and output signals, the control system I/O signal terminals must be connected by wires to a number of different sensors, actuators, machines, etc. FIG. 1 illustrates a conventional industrial system 2 having a number of machines 10 constituting a controlled process 14 that send or receive various field signals 12, including outputs and/or inputs, where the field signals 12 may be analog and/or digital signals. The controlled process 14 is operated by a control system 20 that includes control processing elements (not shown) as well as I/O components 22 for coupling analog and/or digital I/O signals 24 associated with the controlled process 14. Wiring terminals 30 are provided as an intermediate connection point for connecting particular field signals 12 and I/O signals 24 with one another such that the control system 20 receives the necessary inputs to ascertain the pertinent operating conditions associated with the controlled process 14 and such that the controlled process 14 receives the necessary output control signals from the control system 20 for controlling the process 14 according to a control program or routine. In the illustrated system 2, wiring terminals 30 provide a location from which the wiring for the field and/or I/O signals 12, 24 may be grouped as needed into cables or the like to facilitate orderly signal interconnection. However, this conventional interconnection approach requires manual connection of each signal wire 12, 24 to the correct terminal 30. Moreover, this interconnection system is difficult to troubleshoot or reconfigure, and the terminal connections must be carefully documented.

In order to simplify control system interconnection, the wiring terminals 30 may be replaced by custom circuit boards having a series of cable connectors with fixed traces routed on the board to provide a specific set of interconnections between I/O cabling and field signal cabling. However, reconfiguration of the system signal interconnections in such an approach requires layout of a new printed circuit board. In this regard, if a component of a controlled process is upgraded, the wiring interconnection requirements may change, and a new custom printed circuit board would be needed. Thus, the conventional control system wiring techniques are customized for a given control application, and are not well suited to troubleshooting or reconfiguration. Furthermore, the wiring terminals 30 and customized printed circuit boards add cost and complexity to the overall industrial system 2, whereby there is a need for improved routing apparatus for interconnecting field wiring from a controlled process with I/O wiring of a control system.

SUMMARY OF INVENTION

Various aspects of the present invention are now summarized to facilitate a basic understanding of the invention, wherein this summary is not an extensive overview of the invention, and is intended neither to identify certain elements of the invention, nor to delineate the scope thereof. Rather, the primary purpose of this summary is to present some concepts of the invention in a simplified form prior to the more detailed description that is presented hereinafter. The invention relates to programmable routing modules and programming tools and methods by which signal routing is facilitated in the interconnection of field signals of a controlled process with I/O signals of a control system.

In accordance with one or more aspects of the present invention, a programmable routing module is provided for interconnecting field wiring with a control system. The routing module includes a field connection such as board mounted cable connectors that connect field signals from the controlled process to the routing module, as well as an I/O connection for connecting I/O signals from the control system to the module. The routing module further includes an interconnection system that is configurable to connect a desired set of field and I/O signals with one another. In certain embodiments, the configurable interconnection system can be configured more than once (e.g., reconfigurable), and other implementations may provide one time configuration capabilities.

In one possible implementation, the module is comprised of a printed circuit board (PCB) with holes formed between top and bottom sides, and the configurable interconnection system includes conductive pads proximate the holes on the top and bottom sides with pads on opposite ends of the individual holes being electrically isolated and spaced from one another. The interconnection system further comprises conductive traces on the top and bottom sides of the board that couple the I/O and field signals to select groups of the conductive pads, where the pads on opposite ends of the individual holes are connected by conductive traces to a unique pair of signals. Conductive pins are positioned in specific holes to electrically connect pads on opposite ends so as to electrically connect the corresponding signals. In this manner, insertion of pins in the proper locations provides configuration of the PCB to implement a desired set of routing module interconnections involving selected input and/or output field signals of the controlled process and selected input and/or output I/O signals of the controller. The pins may be soldered into the board for one time configurability or may be removable to allow reconfiguration of the routing module.

In another embodiment, the routing module includes programmable logic to selectively operatively couple particular field and I/O signals with one another according to a defined set of interconnections. The programmable logic, moreover, may be operative to store a code representing the configured set of interconnections, and may be further operative to perform a Boolean operation on particular field and/or I/O signals to generate at least one output and to provide the output to the field connection or the I/O connection. In thus manner, the module may be configured to perform safety interlock or other Boolean logic type operations in order to further simplify the interconnection of the controller with the controlled process and to reduce the amount of excess wiring associated therewith. The routing module may also include a communications interface for connection of the programmable logic device with an external device for programming the module and/or for retrieving the code.

In addition, the configurable routing module may have one or more driver circuits with driver inputs and outputs that can be selectively connected to particular field or I/O signals for buffering analog signals, as well as routable logic circuits to perform Boolean operations. In certain possible embodiments, moreover, the module may include an expansion connection for routing one or more of the connected field and/or I/O signals to a second programmable routing module. Furthermore, the field and I/O connections may be made by any suitable means, such as cable connectors for easy connection with cables from the controlled process and control system I/O, and the I/O connection in one exemplary embodiment may include a plurality of rigid board mounted pins extending outward from one side of the board, which are located in a predetermined pattern to allow insertion of extended portions of the pins into receiving sockets of one or more I/O terminal bases or terminal blocks of the control system for electrical connection to a plurality of I/O signals, thereby reducing the cost of signal wiring on the I/O side of the routing module.

Further aspects of the invention relate to methods for configuring a routing module for interconnecting field wiring with a control system. The method comprises defining a set of routing module interconnections between I/O and/or field signals using a software configuration tool, and configuring the routing module by providing the set of routing module interconnections to a programmable logic device on the routing module to establish a desired set of interconnections between a plurality of field signals from a controlled process and a plurality of I/O signals from the control system. In one example, the method may further include generating a code representing the set of routing module interconnections, and storing the code in the programmable logic device. For electronically programmable routing modules, the definition of the interconnections may comprise obtaining a code from the routing module that represents a current set of interconnections, generating a graphical representation of the current set of interconnections according to the code, and allowing a user to modify the interconnections to define a new set of routing module interconnections between I/O and/or field signals, with the new set of interconnections being provided to the programmable logic for reconfiguration of the routing module.

Still further aspects of the invention provide a system for configuring a routing module, including means for defining a set of routing module interconnections between I/O and/or field signals using a software configuration tool, and means for configuring the routing module by providing the set of routing module interconnections to a programmable logic device on the routing module to establish a desired set of interconnections between a plurality of field signals from a controlled process and a plurality of I/O signals from the control system.

BRIEF DESCRIPTION OF THE DRAWINGS

The following description and drawings set forth certain illustrative implementations of the invention in detail, which are indicative of several exemplary ways in which the principles of the invention may be carried out. The illustrated examples, however, are not exhaustive of the many possible embodiments of the invention. Other objects, advantages and novel features of the invention will be set forth in the following detailed description of the invention when considered in conjunction with the drawings, in which.

DETAILED DESCRIPTION OF THE INVENTION

Figure 2A:
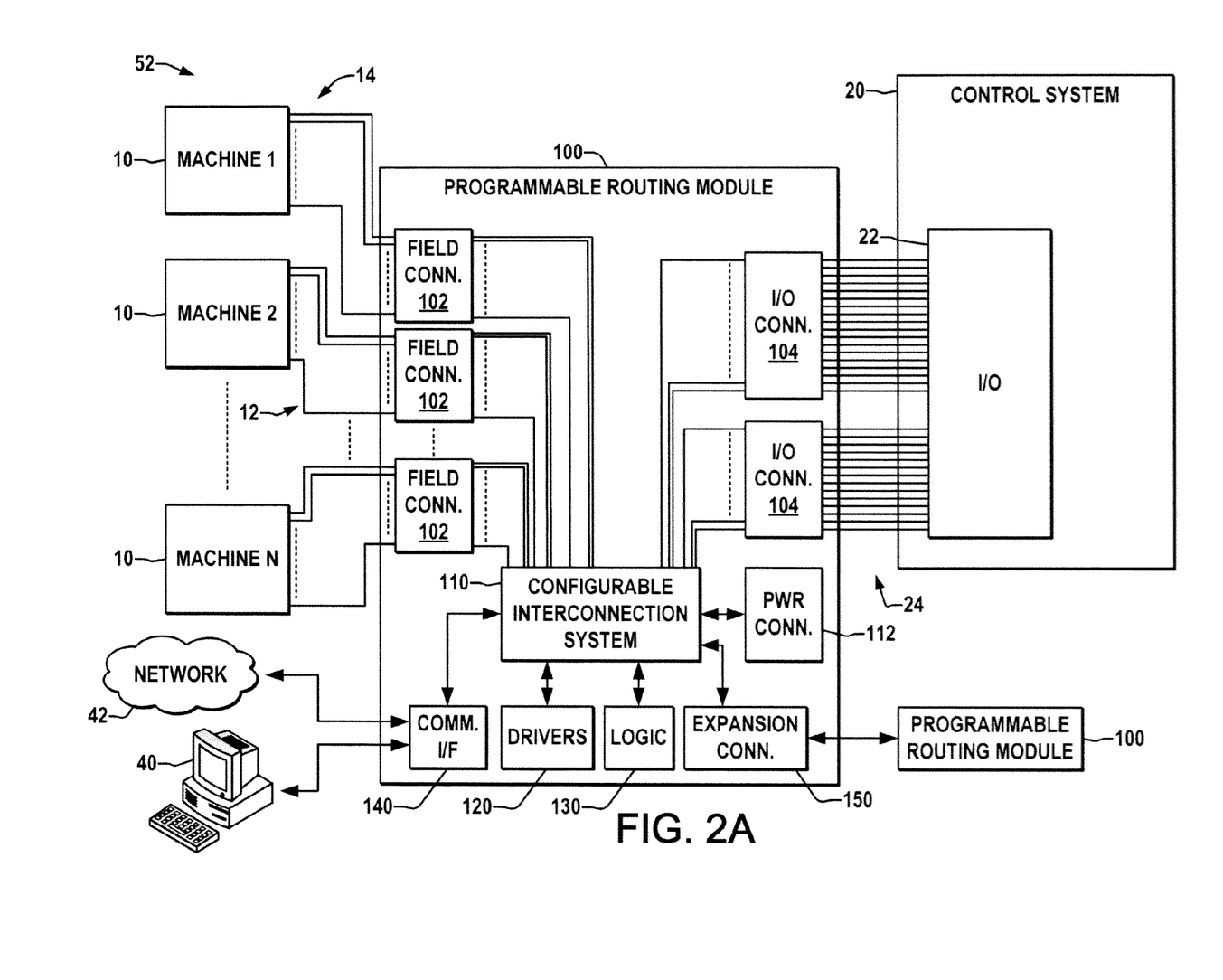
FIG. 2A is a system diagram illustrating an exemplary programmable routing module according to various aspects of the present invention with field and I/O signal connections for coupling signals between a controlled process and a control system, and having a configurable interconnection system that selectively couples particular field and I/O signals with one another.

Referring now to the figures, several embodiments or implementations of the present invention are hereinafter described in conjunction with the drawings, wherein like reference numerals are used to refer to like elements throughout, and wherein the various features are not necessarily drawn to scale. FIG. 2A depicts a system 52 having a programmable routing module 100 in accordance with certain aspects of the invention. The system 52 also includes the controlled process 14 formed by the machines 10 and the field signals 12 associated therewith as previously described in connection with the system 2 of FIG. 1 above, as well as a control system 20 with I/O 22 for coupling I/O signals 24. The exemplary programmable routing module 100 in FIG. 2A is employed in the system 52 to connect the field wiring signals 12 of the controlled process 14 with the I/O signals 24 of the control system 20, where the interconnected signals 12, 24 can be inputs, outputs or both, and the signals 12, 24 can be analog, digital, or both. The module 100 includes a field connection 102, in this case a plurality of N field connectors 102 that are mounted on a module printed circuit board to connect a plurality of the field signals 12 from the process 14 to the routing module 100, and further includes an I/O connection 104, such as one or more board mounted I/O connectors adapted to connect a plurality of the I/O signals 24 from the control system 20 to the module 100. In one possible implementation, the field connection 102 comprises one or more board mounted cable connectors operatively coupleable to field wiring cables to couple the signals 12 from the controlled process 14 and the I/O connection comprises 104 includes one or more board mounted cable connectors operatively coupleable to I/O wiring cables to connect the signals 24. In another implementation illustrated and described below in connection with FIG. 5, the I/O connection 104 includes rigid board mounted conductive pins extending down from the bottom of the module circuit board to facilitate direct connection of the module 100 to one or more I/O terminal bases 22 of the control system 20 without additional I/O cabling.

The programmable routing module 100 includes a configurable interconnection system 110 coupled with the field and I/O connections 102, 104, which is selectively configurable to selectively operatively couple particular field and I/O signals 12, 24 with one another. The system 110 may be a passive, manually configurable implementation, such as illustrated and described further in connection with FIGS. 3A-3E below, or may include a programmable logic device (PLD), processor, or other electronically configurable system for selective signal routing. The module 100 thus provides cost reduction and simplification of the wiring used to connect the control system 20 to the controlled process 14 and further allows use of standardized wiring cables and adaptability to changes in wiring requirements as the control system 20 or the machines 10 of the controlled process 14 may change.

The module 100 may optionally include a power connection 112 for providing external power to the module 100, along with any associated power conversion circuitry (not shown) for powering any active circuits of the module. Other implementations may be passive, in which case the power connection 112 may be omitted. The module 100, in this regard, may optionally include active driver circuits 120 for buffering analog signals being routed by the module 100 (FIG. 2B below), and/or routable logic circuitry 130 for performing Boolean operations to generate outputs based on the states of digital input signals 12, 24, where the drivers 120 and logic circuits 130 are coupled with the interconnection system 110 allowing the configurable interconnections to include routing signals 12, 24 to or from the drivers 120 and the logic 130, where the circuits 120, 130 may be powered from external power via the power connection 112. These optional features 120, 130, in turn, further improve the flexibility and adaptability of the module 100 by providing for selective buffering of analog signals and/or Boolean operations on digital signals, for instance, allowing safety interlock functionality without any additional wiring.

Where the configurable interconnection system 110 includes programmable logic, moreover, a communications interface 140 may be operatively coupled with the interconnection system 110 on the module 100 for communicative connection of the logic device with an external device, such as direct communication with a computer 40 (e.g., via a universal serial bus (USB) or other suitable connection 140) or communication with other external device(s) (not shown) through the interface 140 and an external network 42. The module 100, moreover, may also include one or more expansion connections 150, such as a cable connector, board-to-board connector, etc., coupled to the field connection 102 and to the I/O connection 104 either directly or through the interconnection system 110, to allow connection to a second programmable routing module 100 to route at least some of the field and/or I/O signals 12, 24 to the second module 100. In this regard, the signals 12, 24 may be configurably provided to the expansion connection 150 directly from the field or I/O connections 102, 104, or through the drivers 120 or logic 130 by programmable routing using the configurable interconnection system 110.

Figure 2B:
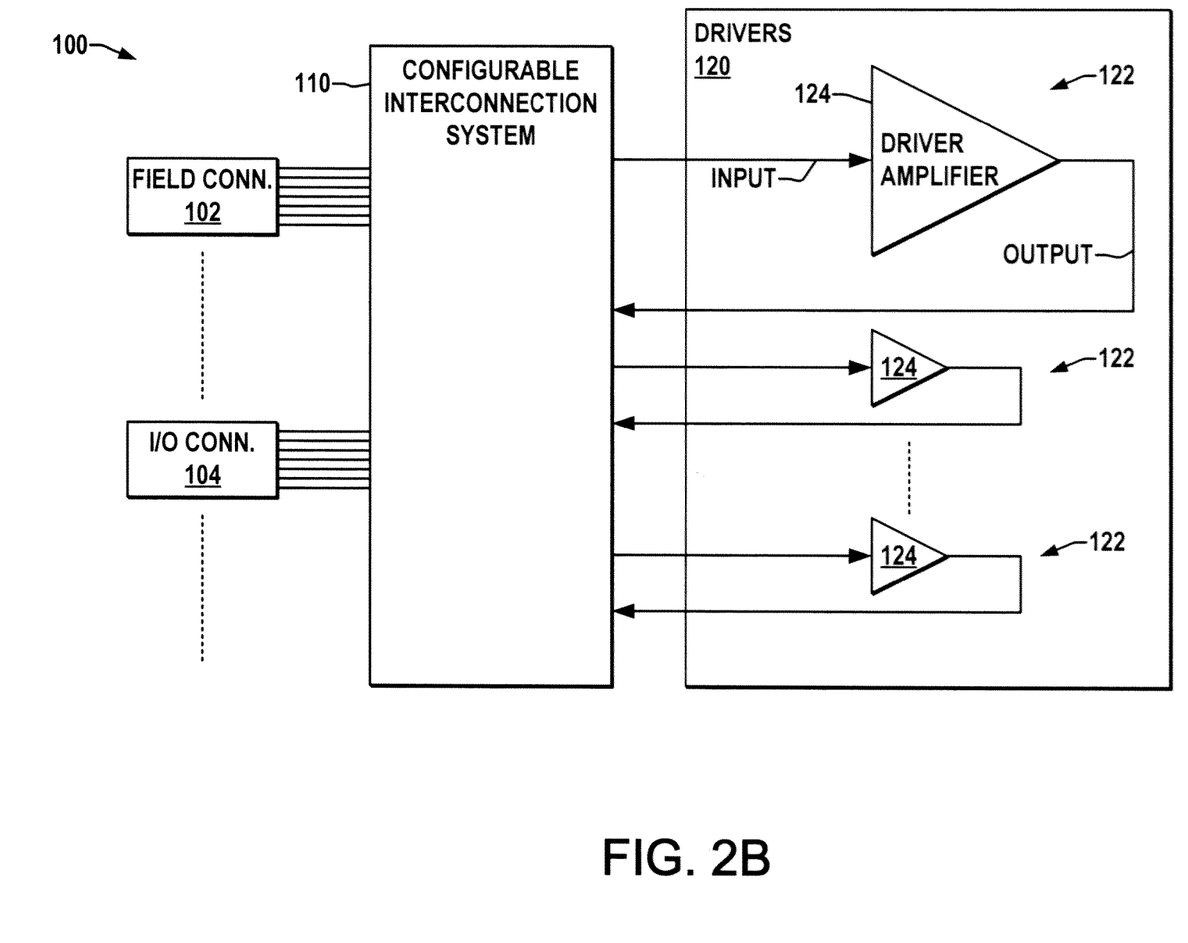
FIG. 2B is a detailed schematic diagram illustrating exemplary routable driver circuits in the routing module of FIG. 2A.

FIG. 2B illustrates further details of the exemplary routable drivers 120 including several routable driver circuits 122 in the routing module 100. The driver circuits 122 each include an input selectively electrically coupleable via the interconnection system 110 to a particular field or I/O signal 12, 24, as well as an output that is also selectively electrically coupleable via the system 110 to another particular field or I/O signal 12, 24. The driver circuits 122 may thus provide analog signal buffering, level shifting, amplification, etc., for operatively connecting an analog signal output by the control system 20 or the controlled process 14 in order to provide a suitable analog input signal for connection to the controlled process 14 or the control system 20.

Figure 2C:
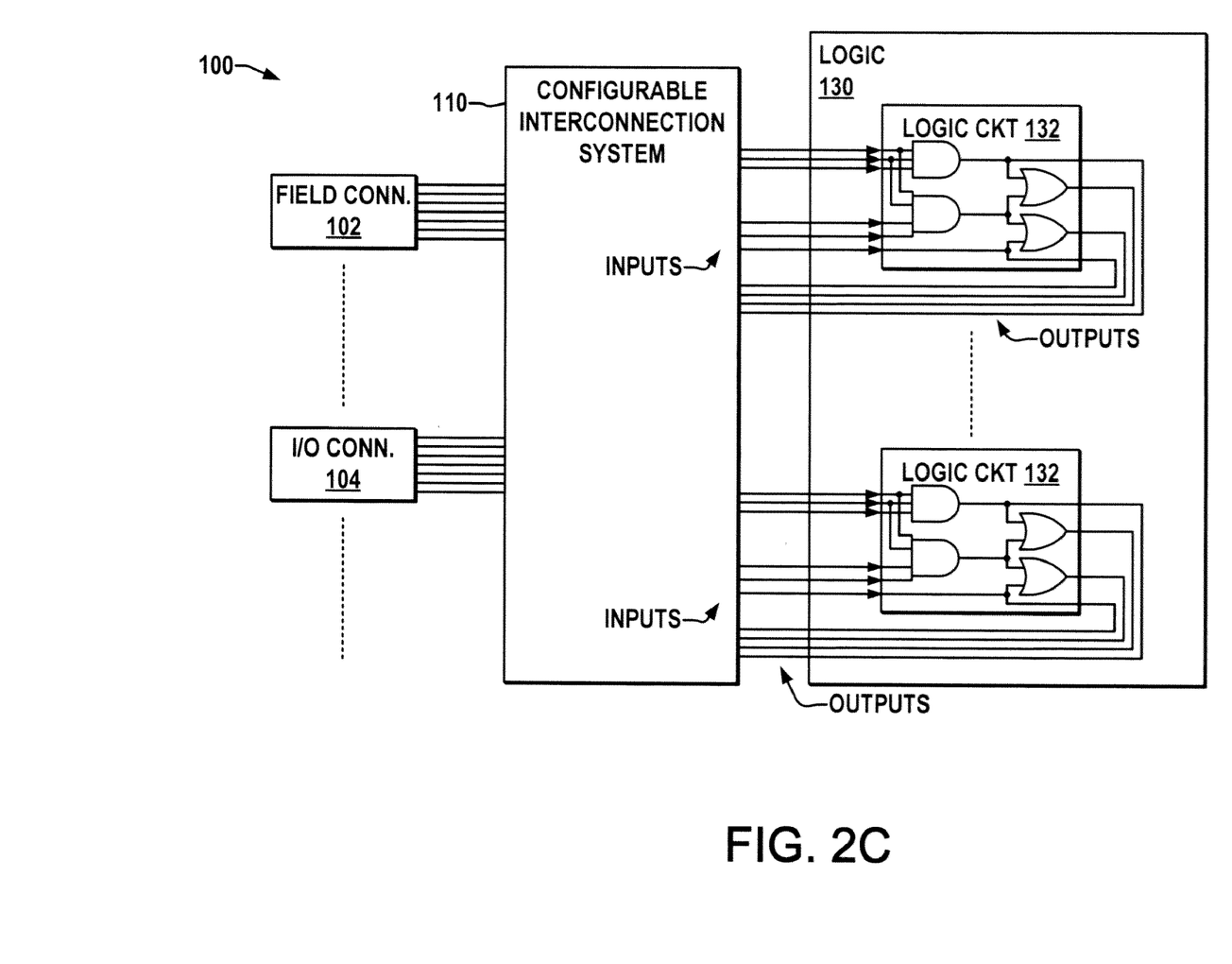
FIG. 2C is a detailed schematic diagram illustrating exemplary routable logic circuits in the routing module of FIG. 2A.

FIG. 2C further illustrates the routable logic 130 of the exemplary module 100, including several logic circuits 132 individually including two or more inputs and one or more outputs that are each electrically coupleable to particular field and/or I/O signals 12, 24 via the configurable interconnection system 110, where the logic circuits 132 perform a Boolean operation on the inputs to derive the output(s). The logic circuits 132 may be of any form and construction, wherein the examples of FIG. 2C provide interlock safety gating functionality. Other logic circuits are possible, for instance, including individually routable AND, OR, and inverter gates so that a user may selectively create any desired Boolean function by selective configuration of the interconnection system 110.

Figure 3A:
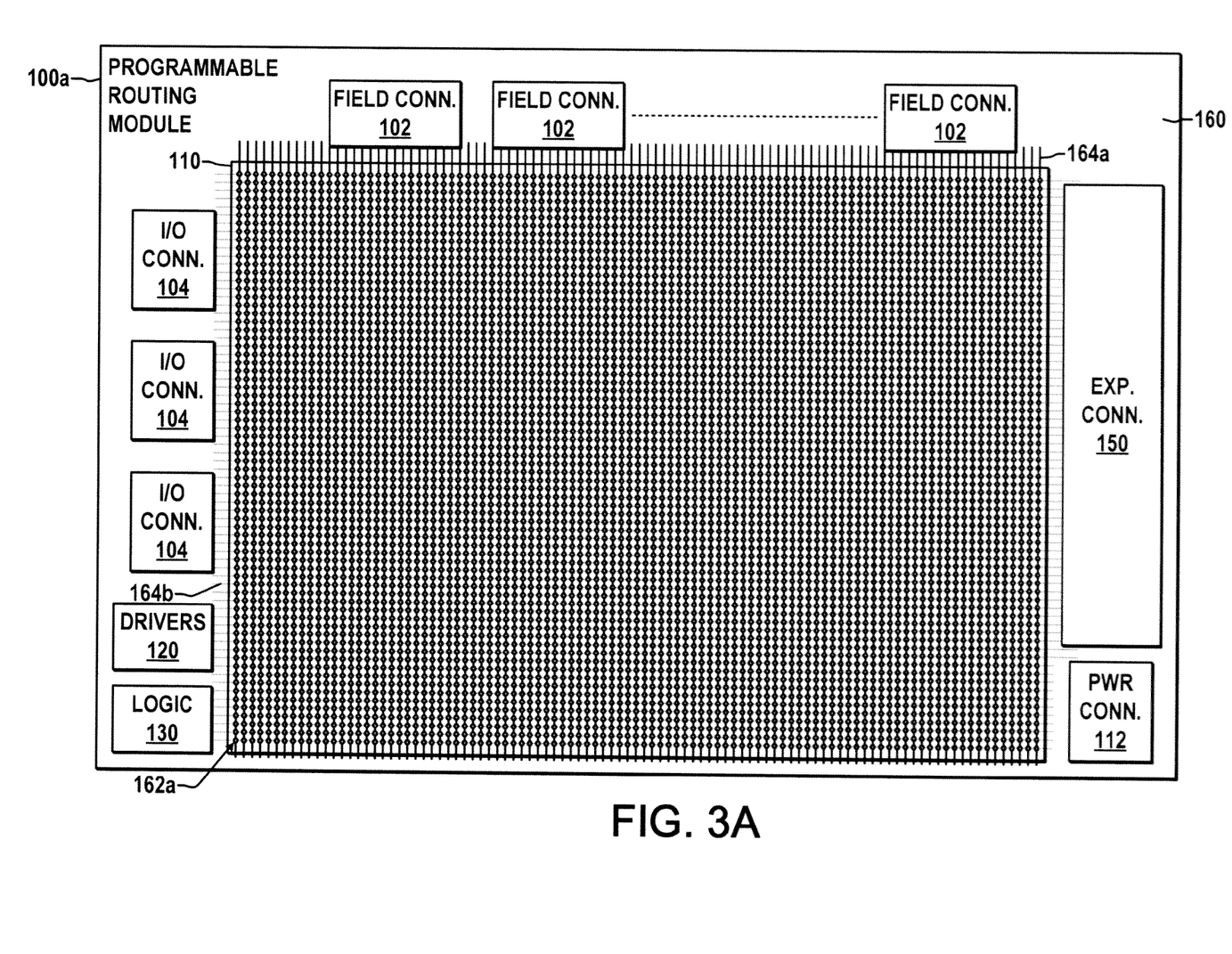
FIG. 3A is a top plan view illustrating a first exemplary embodiment of the programmable routing module having a manually configurable interconnection system with conductive traces and pads.
Figure 3B:
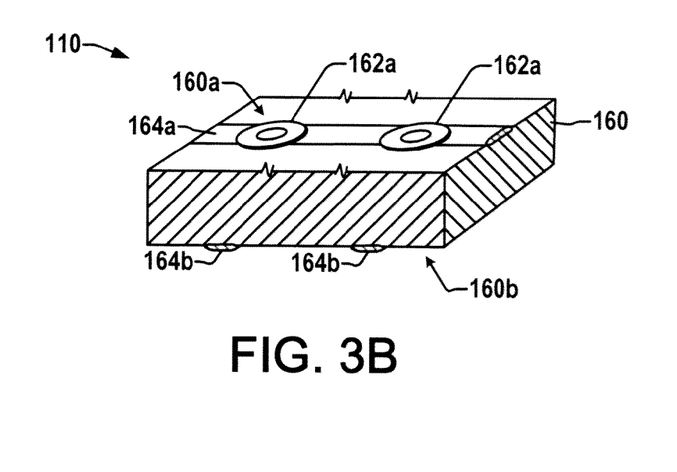
FIG. 3B is a partial sectional upper perspective view illustrating a portion of the module of FIG. 3A with an exemplary conductive trace and conductive pads on a top side thereof.
Figure 3C:
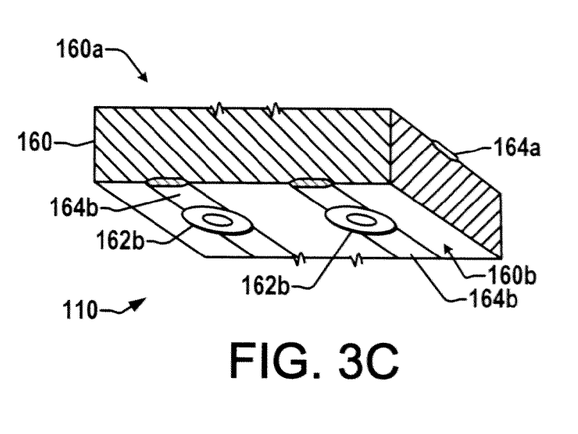
FIG. 3C is a partial sectional lower perspective view illustrating the exemplary portion of the module of FIGS. 3A and 3B with exemplary conductive traces and conductive pads on a lower side thereof.
Figure 3D:
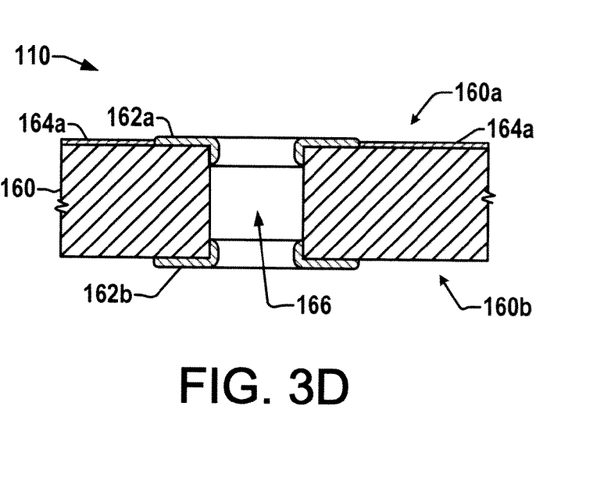
FIG. 3D is a partial sectional side elevation view of a portion of the routing module of FIGS. 3A-3C with conductive pads on either end of an exemplary hole through the module board where the top and bottom pads of the illustrate hole are electrically disconnected and spaced from one another.
Figure 3E:
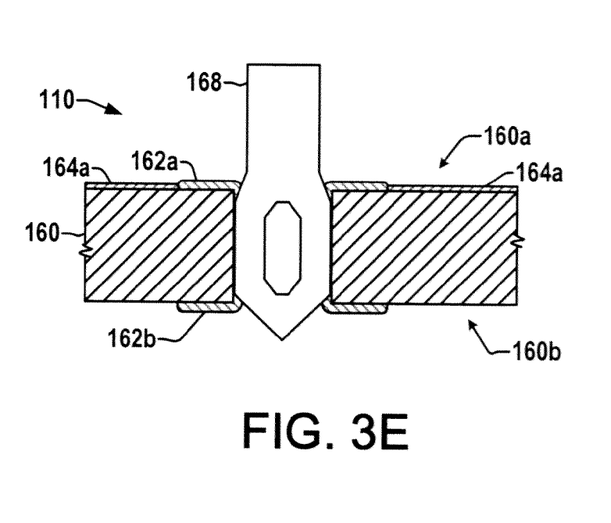
FIG. 3E is a partial sectional side elevation view of the exemplary portion of the routing module of FIG. 3D with a conductive pin inserted in the hole to electrically connect the upper and lower pads and the signals associated therewith.

Referring now to FIGS. 3A-3E, a first exemplary programmable routing module 100a is illustrated with a printed circuit board (PCB) structure 160, in which the interconnection system 110 includes conductive traces 164 and conductive pads 162, and the module is manually configured by installing conductive pins 168 in certain thru-holes 166 of the board 160. This implementation provides the field and I/O connections 102, 104 in the form of board mounted cable connectors, such as D-sub connectors, for easy coupling with wiring cables from the controlled process 14 and the I/O 22 of the control system 20 (FIG. 2A), although other types of field and I/O connections 102, 104 can be provided. The module 100a, moreover, may optionally include drivers 120 and/or logic circuits 130 as described above, although not a requirement. As best illustrated in FIGS. 3B-3E, the printed circuit board 160 includes holes 166 formed between top and bottom sides 160a, 160b of the board 160, and the configurable interconnection system 110 is comprised of a plurality of conductive pads 162a and 162b formed on top and bottom sides of the board, respectively, with the pads 162 being proximate the holes 166 and with pads 162a and 162b on opposite ends of the individual holes 166 being electrically isolated and spaced from one another (FIG. 3D). The conductive traces 164a and 164b are formed on the top and bottom sides 160a and 160b, respectively, and are individually connected (routed) to one of the field or I/O connections 102, 104 such that the I/O and field signals are individually coupled to select groups of the conductive pads 162 with pads 162a and 162b on opposite ends of the holes 166 being connected by conductive traces 164a and 164b, respectively, to a unique pair of signals 12, 24. To interconnect a given pair of signals 12, 24, a conductive pin 168 is positioned as shown in FIG. 3E in the corresponding hole 166 to electrically connect (short) the upper and lower pads 162a and 162b on opposite ends thereof, thereby electrically connecting the corresponding signals 12, 24. In this fashion, a desired set of routing module interconnections can be configured by inserting pins 168 in the appropriate hole locations in the interconnection system 110. The pins 168 may then be optionally soldered into place for one-time configuration of the module 100a, or the conductive pins may be removable allowing reconfiguration of the routing module 100a.

In another possible implementation, a similar matrix of traces may be used to construct a PCB based configurable interconnection system 110, with fuses positioned between traces 164 corresponding to each pair of routable field and I/O signals 12, 24, wherein the system 110 could be configured or programmed by application of suitable voltages to specific pairs of field and I/O signal connections to blow (open-circuit) fuses associated with signals that are not desired to be connected. In this manner, a one-time configurable routing module can be programmed or customized for a given interconnection application without the need to design and route a specific PCB layout. In this scenario, if a subsequent routing change is desired, and new module could be similarly programmed by blowing an appropriate set of fuses to implement the new set of routing interconnections.

Figure 4:
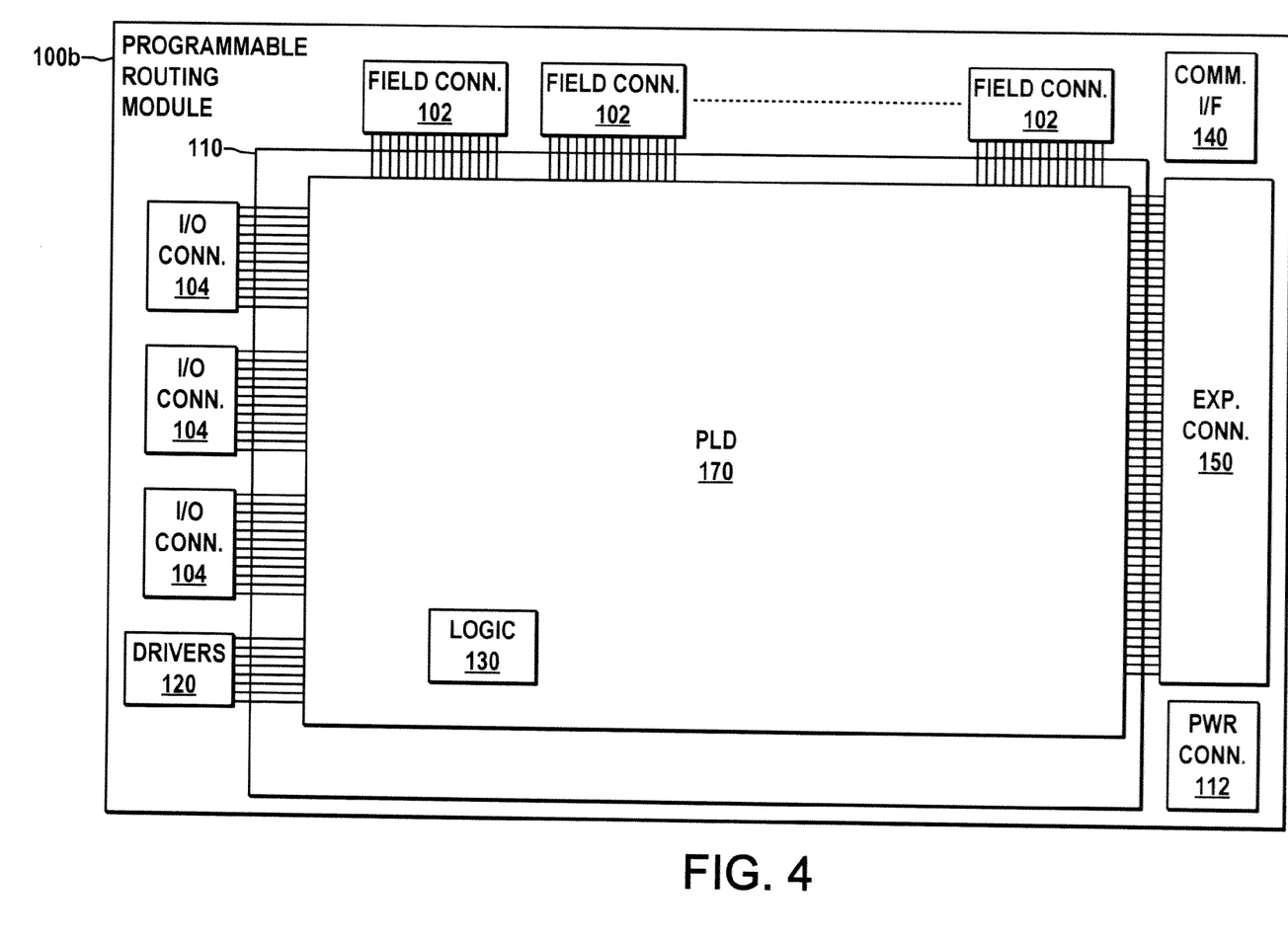
FIG. 4 is a top plan view illustrating a second exemplary embodiment of the programmable routing module having a programmable logic device (PLD) providing programmatic configuration of the routing module for selective electrical coupling of particular field and I/O signals with one another according to a defined set of interconnections.

Referring now to FIG. 4, another exemplary implementation provides an electronically programmable routing module 100b in which the configurable interconnection system 110 comprises a programmable logic (PLD) 170, which can be any form of user configurable hardware, software, firmware, etc., such as programmable logic, a processor system with or without external memory, a PGA, a ROM, an ASIC, etc., which may include both analog and digital circuitry, such as routable drivers 120 and/or routable logic 130. In the illustrated example, the PLD 170 can be programmed to implement the routable logic functions 130 internally, and provides for configurable routing to external drivers 120 on the module 100b. In the example of FIG. 4, the PLD 170 is coupled with the field and I/O connections 102, 104 and is configurable or programmable to operatively interconnect any two or more of the signals 12, 24 associated therewith by direct electrical connection or other operative interconnection according to establish a desired set of interconnections. In this respect, the PLD can provide for direct electrical connection thereof or may operate external connection circuitry (e.g., switches, fuses, etc.), so as to selectively operatively couple particular field and I/O signals 12, 24 with one another according to a defined set of interconnections.

In one example, the PLD 170 is one-time programmable, and in another possible embodiment, the PLD 170 and hence the module 100b may be reconfigured any number of times. The module 100b also preferably includes a communications interface 140 such as a universal serial bus (USB) or other suitable communications means, by which the PLD 170 can be programmed by an external device (e.g., computer 40 in FIG. 2A) coupled directly to the module 100b or through a network 42 (FIG. 2A). In addition, the module 100b may be adapted to store a code (e.g., a hexadecimal value, whether encrypted or not) that represents the set of programmed interconnections, where the code may be generated by an external programming/configuration tool and stored in the PLD 170, or the PLD 170 may generate and save the code after being configured. Thereafter, the code may be accessible by an external device, such as a software configuration system or tool, from which the tool can ascertain the current configuration of the module 100b (with the appropriate key if encrypted and/or with the appropriate password if security protected).

Figure 5:
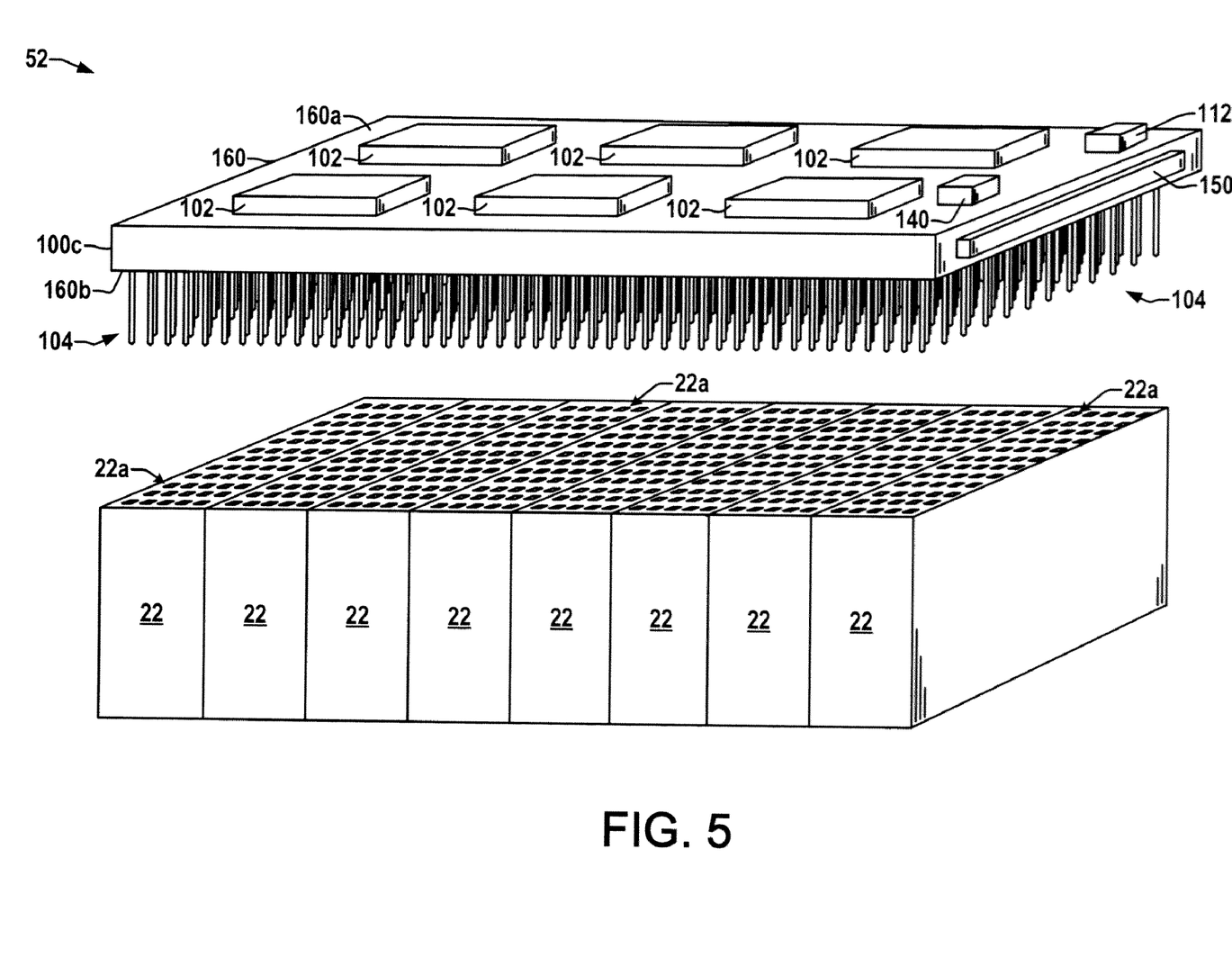
FIG. 5 is a perspective view illustrating a third exemplary embodiment of the programmable routing module in which the I/O connection includes a plurality of pins extending outward from one side of the routing module board for easy connection with I/O terminal bases of the control system.

FIG. 5 illustrates another possible implementation of a programmable routing module 100c comprising a printed circuit board 160 where the I/O connection 104 comprises a plurality of board mounted rigid pins extending downward from the bottom side 160b of the board 160 for connection with push-pin type terminal bases or terminal blocks 22 of the control system 20. In this embodiment, the pins 104 are spaced in a predetermined pattern to allow insertion of the extended portions thereof into receiving sockets 22a of the terminal bases 22 for electrical connection to a plurality of I/O signals 24, and the top side 160a of the module 100c includes d-sub or other suitable connectors 102 for field wiring. In this regard, the use of the board mounted pins 104 as the I/O connection for the module 100c advantageously saves cost and space since no additional wiring or cables are needed for coupling the I/O signals 24 of the control system 20.

Figure 6:
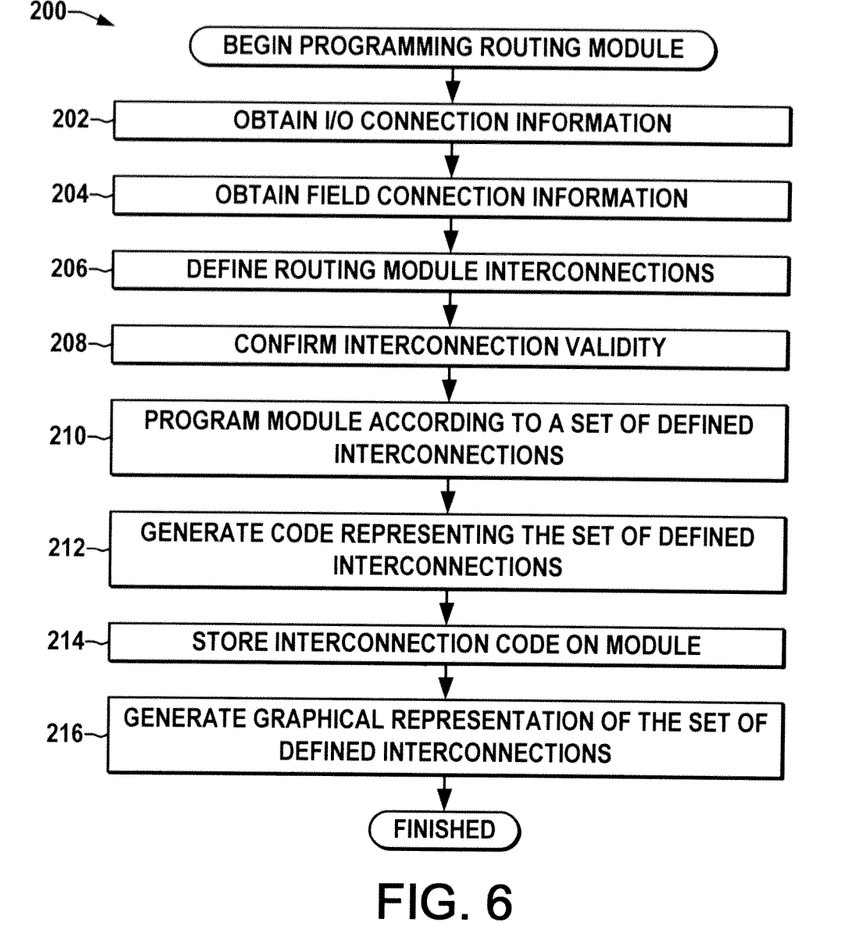
FIGS. 6-8 are flow diagrams illustrating various methods for programming a configurable routing module using a software programming tool or other routing module configuration system in accordance with other aspects of the invention.
Figure 7:
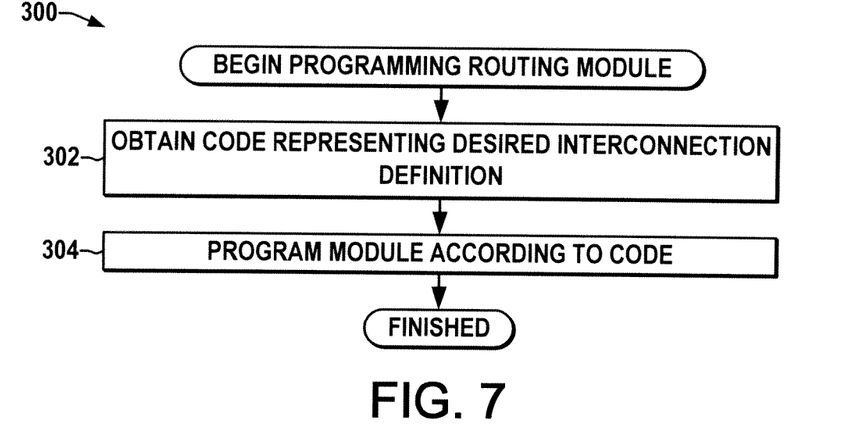
Figure 8:
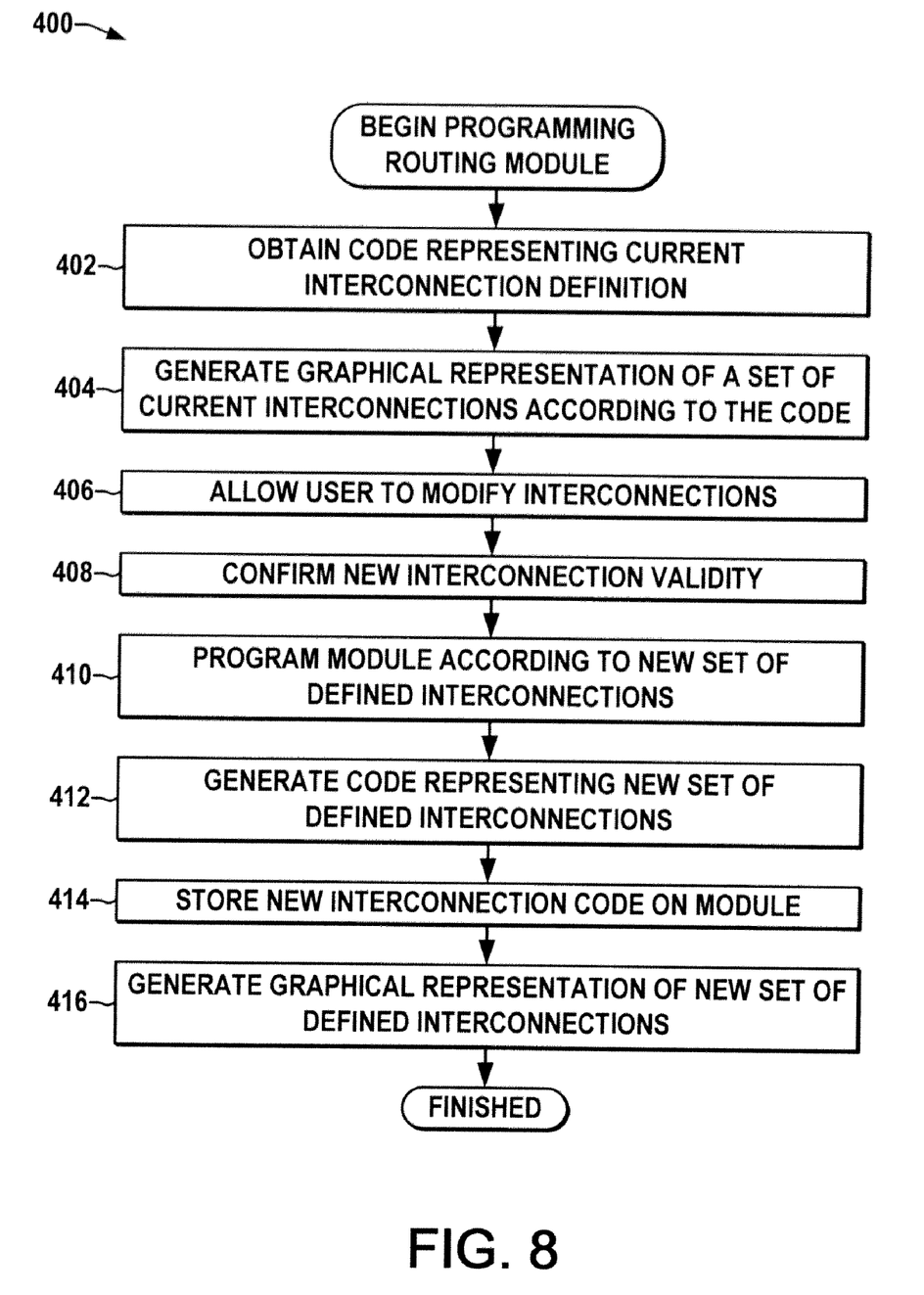

Referring now to FIGS. 6-8, further aspects of the invention provide methods and systems for configuring a programmable routing module 100 for interconnecting field wiring 12 with a control system 20, where these figures provide flow diagrams 200, 300, and 400 to illustrate various exemplary module programming methods. The methods 200, 300, and 400 can advantageously be implemented in routing module configuration software tools which can be a page served by the PLD 170 of the module 100 or a utility in a PC 40 (FIG. 2A) that acts as a master to the module 100 or other suitable implementation. Such software may also be adapted to read a configuration file from RSL5k5, RSNetWorx, or other control software packages, or can be manually loaded with catalog number information about the I/O modules 22 used in a given control system 20 to assist a user in configuring the interconnections for a given module 100. The software, moreover, can generate output files in a standard CAD file format or other suitable format to provide a graphical representation of the set of defined interconnections, such as wiring diagram information including graphics of the relevant connectors forming the field or I/O connections 102, 104, preferably including logical address cross references to the I/O points. In operation, moreover, the configuration software may comprise any suitable user interface, such as a graphical user interface (GUI) with of multiple pages following a logical progression through the steps required to configure and initialize a programmable routing module 100.

In general, the methods of the invention include definition of a set of routing module interconnections between I/O and/or field signals (e.g., signals 12, 24 above) using a software configuration tool, such as an application running on the computer 40 of FIG. 2A above), and configuring the routing module 100 by providing the set of defined interconnections to a programmable logic device (e.g., PLD 170 above) on the routing module 100. Although the exemplary methods 200, 300, and 400 are illustrated and described hereinafter in the form of a series of acts or events, it will be appreciated that the various methods of the invention are not limited by the illustrated ordering of such acts or events except as specifically set forth herein. In this regard, except as specifically provided in the claims, some acts or events may occur in different order and/or concurrently with other acts or events apart from those acts and ordering illustrated and described herein, and not all illustrated steps may be required to implement a process or method in accordance with the present invention. The methods, moreover, may be implemented in hardware, software, or combinations thereof, in order to provide the described functionality, wherein these methods can be practiced in hardware and/or software of the above described programmable routing modules 100 serving to host a configuration tool, or in external devices including computers or other forms of logic, hardware, or software in any single or multiple entities operatively associated with the module 100 directly or through a network or other communications means, wherein the invention is not limited to the specific applications and implementations illustrated and described herein.

In FIG. 6, the routing module programming method 200 includes obtaining I/O connection information at 202, for instance by prompting a user for catalog numbers or other identifying indicia representative of the I/O modules or other I/O components 22 in the control system 20 with which the programmed module 100 is to interface for interconnecting I/O signals 24. At 204, information is obtained for the field connection 102, such as connector types, etc. With this information, the user may be presented with a graphical interconnection definition environment with which the user defines the desired set of routing module interconnections at 206. In one implementation, the interconnection definition at 206 may be done manually with the user selecting each I/O point for each connector 102, 104 or in a semi automatic way whereby the programmer chooses a quantity of digital inputs, outputs/analog inputs/outputs, etc., to be assigned to each connector 102, 104 with manual assignment of other I/O points individually. Alternatively, the interconnection definition at 206 may be accomplished in a fully automatic way in which groups of points are assigned generically to a "standard" connector 102, 104, and the assignments take place automatically. At 208, the software configuration tool may then optionally check or confirm the validity of the defined set of interconnections and indicate any errors to the user, and may also print or otherwise render a graphical representation or "proof page" for verification of the defined configuration before proceeding.

At 210, the method 200 provides for programming the module 100 according to the defined set of routing interconnections by providing the interconnections to the programmable logic device 170 on the routing module 100. The actual programming may be done simply through programming the PLD 170 or thereafter by the PLD performing one or more configuration acts with respect to the interconnection system 110, such as by blowing fuses, burning traces, setting switch states, etc. In other embodiments, an external device may perform the actual board programming, for instance, by application or suitable terminal voltages to blow specific fuses on the module 100, etc. At 212 and 214, the method 200 may also include generating a code representing the set of defined interconnections, and storing the code on the module 100. In addition, the method 200 may further include generating a graphical representation at 216 (e.g., printing out an interconnection drawing, generating a CAD file, etc.) that depicts the defined set of interconnections for documentation of the control system setup.

FIG. 7 illustrates another exemplary programming method 300 in which a preexisting code is obtained at 302 representing a desired set of routing module interconnections. This may be obtained, for example, from a programmed module 100, from a data store of such configuration codes in a software package, or other suitable source, including manual entry of such a code by a user. At 304, a programmable routing module 100 is programmed according to the code, with the software performing any suitable translation of the code into a set of defined interconnections in order to program a PLD 170 on the module 100 or to otherwise program the module 100 to implement the desired interconnections represented by the code.

FIG. 8 illustrates another exemplary module programming method 400, which is particularly useful in modifying an existing configuration, such as when a portion of the controlled process 14 or the control system 20 is changed requiring reconfiguration of an installed module 100. In the method 400, the definition of the routing module interconnections begins at 402 with a code being obtained from the routing module 100 or elsewhere that represents the current set of interconnections. A graphical representation of the current set of interconnections is generated at 404 according to the code, and a user is allowed at 406 to modify the interconnections in order to define a new set of routing module interconnections between the I/O and/or field signals 24, 12. The method 400 may then include optionally confirming the validity of the defined set of interconnections at 408. The module 100 is then configured at 410 according to the new set of defined interconnections, and a code is generated at 412 representing the set of newly defined interconnections. The code is then stored at 414 on the module 100 and a graphical representation of the configuration may then be generated at 416 before the method 400 ends.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (I.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. A programmable routing module for interconnecting field wiring with a control system, the routing module comprising:
   a field connection adapted to connect a plurality of field signals from a controlled process to the routing module;
   an I/O connection adapted to connect a plurality of I/O signals from a control system to the routing module, the I/O signals being suitable for direct connection to the field signals of the controlled process;
   a configurable interconnection system coupled with the field connection and with the I/O connection, the configurable interconnection system being selectively configurable to electrically couple particular field and I/O signals with one another.

2. The programmable routing module of claim 1, wherein the configurable interconnection system is selectively configurable to directly connect at least some particular field and I/O signals with one another.

3. The programmable routing module of claim 1, wherein the configurable interconnection system is configurable more than once.

4. The programmable routing module of claim 1, wherein the configurable interconnection system is configurable only once.

5. The programmable routing module of claim 1, wherein the module comprises a printed circuit board with holes formed between top and bottom sides of the board, and wherein the configurable interconnection system comprises:
   a plurality of conductive pads formed on top and bottom sides of the board proximate the holes formed in the board with the conductive pads on opposite ends of the individual holes being electrically isolated and spaced from one another;
   a plurality of conductive traces formed on the top and bottom sides of the board coupling the I/O and field signals to select groups of the conductive pads with pads on opposite ends of the holes being connected by conductive traces to a unique pair of signals; and
   a plurality of conductive pins positioned in specific holes to electrically connect pads on opposite ends of the specific holes to electrically connect the corresponding signals.

6. The programmable routing module of claim 1, wherein the configurable interconnection system comprises a programmable logic device coupled with the field connection and with the I/O connection, the programmable logic device being configurable to selectively operatively couple particular field and I/O signals with one another according to a defined set of interconnections.

7. The programmable routing module of claim 6, wherein the programmable logic device is operative to perform a Boolean operation on at least two particular field and/or I/O signals to generate at least one output and to provide the output to the field connection or the I/O connection.

8. The programmable routing module of claim 6, wherein the configurable interconnection system is selectively configurable to directly connect at least some particular field and I/O signals with one another.

9. The programmable routing module of claim 6, comprising a communications interface operatively coupled with the configurable interconnection system for communicative connection of the configurable interconnection system with an external device.

10. The programmable routing module of claim 6, comprising at least one driver circuit with an input selectively electrically coupleable to a particular field or I/O signal and with an output selectively electrically coupleable to another particular field or I/O signal.

11. The programmable routing module of claim 6, comprising at least one logic circuit with two or more inputs selectively electrically coupleable to particular field and/or I/O signals and with at least one output selectively electrically coupleable to particular field and/or I/O signals, the logic circuit being operative to perform a Boolean operation on the inputs to derive the at least one output.

12. The programmable routing module of claim 6, further comprising an expansion connection coupled to the field connection and to the I/O connection, the expansion connection being coupleable to a second programmable routing module to route at least some of the field and/or I/O signals to the second programmable routing module.

13. The programmable routing module of claim 1, wherein the configurable interconnection system is selectively configurable to electrically couple particular field and I/O signals with one another according to a defined set of interconnections and to store a code representing the set of interconnections.

14. The programmable routing module of claim 1, comprising a communications interface operatively coupled with the configurable interconnection system for communicative connection of the configurable interconnection system with an external device.

15. The programmable routing module of claim 1, comprising at least one driver circuit with an input selectively electrically coupleable to a particular field or I/O signal and with an output selectively electrically coupleable to another particular field or I/O signal.

16. The programmable routing module of claim 1, comprising at least one logic circuit with two or more inputs selectively electrically coupleable to particular field and/or I/O signals and with at least one output selectively electrically coupleable to particular field and/or I/O signals, the logic circuit being operative to perform a Boolean operation on the inputs to derive the at least one output.

17. The programmable routing module of claim 1, further comprising an expansion connection coupled to the field connection and to the I/O connection, the expansion connection being coupleable to a second programmable routing module to route at least some of the field and/or I/O signals to the second programmable routing module.

18. The programmable routing module of claim 1, wherein the module comprises a printed circuit board, and wherein the field connection comprises one or more board mounted cable connectors operatively coupleable to field wiring cables.

19. The programmable routing module of claim 1, wherein the module comprises a printed circuit board, and wherein the I/O connection comprises one or more board mounted cable connectors operatively coupleable to I/O wiring cables.

20. The programmable routing module of claim 1, wherein the module comprises a printed circuit board, and wherein the I/O connection comprises a plurality of board mounted pins extending outward from one side of the board and spaced in a predetermined pattern to allow insertion of extended portions of the pins into receiving sockets of one or more I/O terminal bases of the control system for electrical connection to a plurality of I/O signals.

* * * * *